Figure 1:
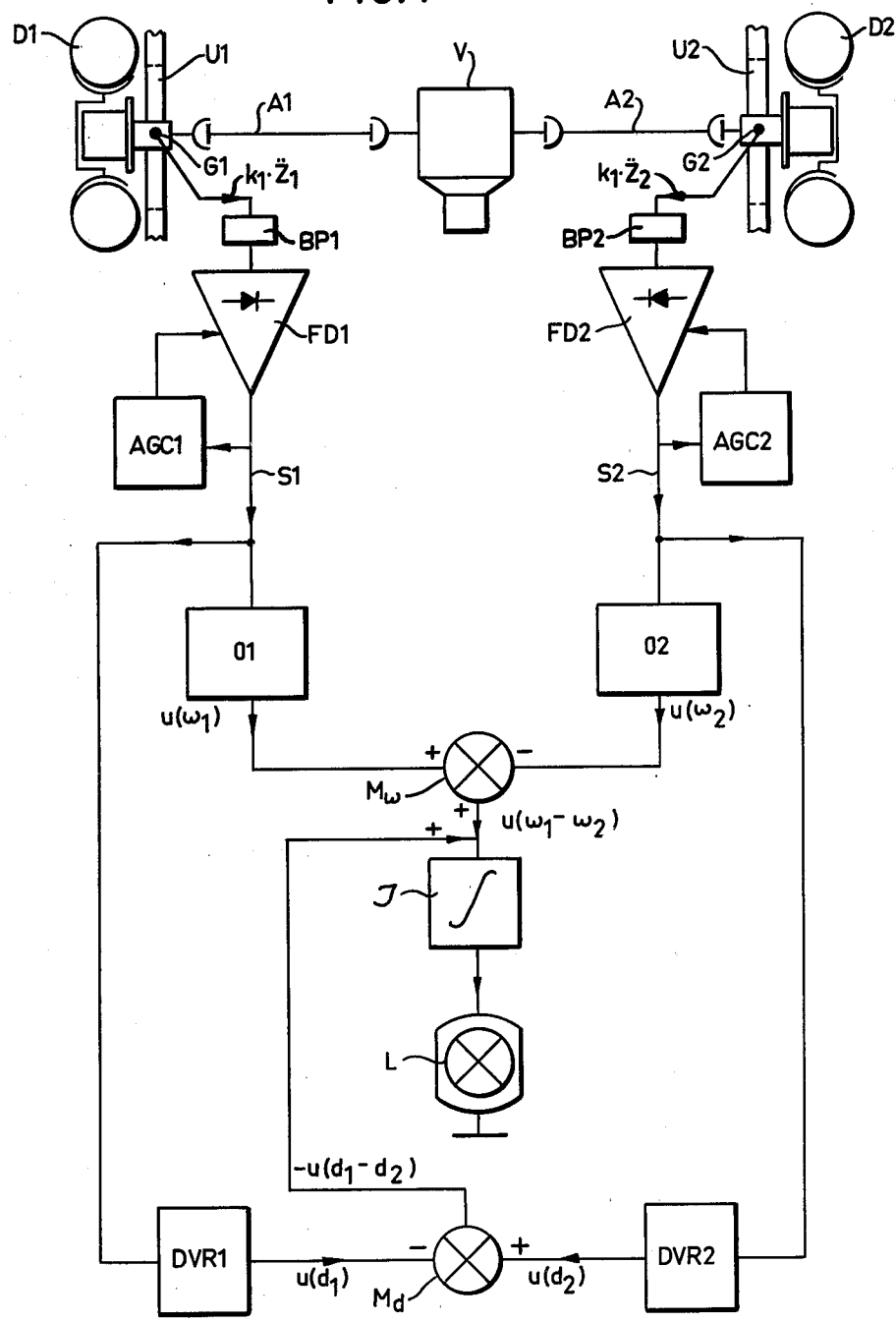

United States Patent [19]

Sinha et al.

[11] 4,355,297
[45] Oct. 19, 1982

[54] DEVICE FOR INDICATING AIR PRESSURE IN VEHICLE TIRES

[75] Inventors: Brajnandan Sinha, 1 Spovgränd, Lulea, Sweden, S-951 47; Sven-Erik Tiberg, Gammelstad, Sweden

[73] Assignee: Brajnandan Sinha, Lulea, Sweden

[21] Appl. No.: 135,151

[22] Filed: Mar. 28, 1980

[30] Foreign Application Priority Data

Apr. 3, 1979 [SE] Sweden ................... 7902946

[51] Int. Cl.³ ............................................. B60C 23/00
[52] U.S. Cl. ..................................... 340/58; 73/146.2; 73/579; 73/658; 340/669
[58] Field of Search ............... 340/58, 27 R, 669, 671; 73/65, 146, 146.2, 579, 658

[56] References Cited

U.S. PATENT DOCUMENTS

| | | | |
|---|---|---|---|
| 3,455,148 | 7/1969 | Foster et al. ................ | 340/669 X |
| 3,526,873 | 9/1970 | Burt ............................ | 340/58 |
| 3,613,075 | 10/1971 | Griffiths et al. ............... | 340/58 |
| 3,707,701 | 12/1972 | Neu ............................. | 340/58 |
| 3,735,344 | 5/1973 | Weintraub et al. ............. | 340/58 |
| 3,900,828 | 8/1975 | Lage et al. .................... | 340/27 R |
| 4,149,140 | 4/1979 | Evans et al. .................. | 340/58 |
| 4,224,597 | 9/1980 | Di Cecio ....................... | 340/58 |
| 4,236,407 | 12/1980 | Alpini et al. .................. | 73/579 |

*Primary Examiner*—John W. Caldwell, Sr.
*Assistant Examiner*—Joseph E. Nowicki
*Attorney, Agent, or Firm*—Cushman, Darby & Cushman

[57] ABSTRACT

According to the invention, a transducer is mounted fixed in the area of the hub of the wheel in question, which transducer continuously is affected by the changes in the dynamic behavior of the tire which occurs at driving owing to dropping air pressure. The output signal from the transducer is processed in an electronic unit for forming a secondary signal, which is an expression for the vertical acceleration component in the output signal. When the secondary signal deviates by an amount critical for the driving safety from a nominal value, warning is released.

6 Claims, 2 Drawing Figures

DEVICE FOR INDICATING AIR PRESSURE IN VEHICLE TIRES

This invention relates to a device for indicating unsatisfactory air-pressure in vehicle-tires by using transducing means, which are rigidly attached to the respective hub and affected continuoulsy by changes in the tire properties caused by a change in the air-pressure of the tire of a running vehicle, which transducing means are connected to an electronic unit for releasing a warning signal when the air-pressure conditions pass a predetermined limit critical for the driving safety.

Incorrect inflation pressure, as known, results in too small a contact surface of the tire with the roadway when the pressure is too high, and in poor stability of the tire when the pressure is too low. Especially in this latter case, the road holding ability is reduced. When the inflation pressure in both rear wheel tires is too low, the road holding ability at the rear of the vehicle is deteriorated, especially at rear wheel drive, whereby the course stability of the vehicle is jeopardized, i.e. the vehicle winds ahead. However, when only one tire in a pair of tires has too low pressure, the vehicle looses its stability in one direction, because the vehicle then inclines in the direction to said tire, and the other tire thereby is subjected to a reduced load. This case implies that the vehicle heels in different directions, which is much more dangerous than if there is too low an equal pressure in both tires.

The same also applies to the front wheel tires, which indicates itself by a substantial deterioration of the steering capacity of the vehicle.

As long as the vehicle is driven straight forward and is not exposed to any outside lateral forces (due to eddywind, rutted road, evasive actions etc.), the driver does not notice when the pressure in a tire is too low. However, when a firm road holding is really required, for example at the aforesaid lateral forces, the driver awkwardly is made aware of the low tire pressure. Various systems have been proposed to indicate too low tire pressure and thereby to reduce the risk of accidents.

At one such conventional system, the tire valve is equipped with an indicating means, which signals too low pressure by red light. This system has not to an appreciable extent been used in practice, because it requires the driver to stop the vehicle and to read the indicating means of each wheel. Moreover, no warning for lack of stability is indicated in advance when leakages rapidly developing at driving give rise to rapid pressure drop.

A further system, which is of a more advanced and continuously monitoring nature, and which informs the driver at driving on decreasing air pressure, is disclosed in U.S. Pat. No. 3,526,873. This system is of the kind referred to above in the introductory portion of this description. Said system has the characterizing feature, that the release of the indication is based on the amplitude of the tire vibrations, and the arrangement is such that the output signal of the transducing means increases with decreasing inflation pressure, i.e. indication is effected when the output signal amplitude exceeds a certain maximum value, which is set manually. This system has not been put to widespread use, especially because of its inherent uncertainty and groundless indication when the vehicle runs over marked bumps in the roadway.

The present invention renders possible both safer and more sensitive indication, in that the transducing means consist of accelerometers, the outputs of which are connected to respective circuits in order from the received vertical acceleration signals decreasing with dropping air pressure to recover the natural oscillation frequency component of the tire, and circuits for recovering the attenuation component of the tire, which components thereafter are compared with each other or with respective reference signals, and the resulting differences in frequency and attenuation release the warning signal when said limit is being passed.

In this connection, two ways can be chosen between, viz. (1) to measure the air pressure individually for each wheel, and (2) to measure relatively the air pressures of two wheels on the same axle or on one axle each.

For coupling-technical reasons, the latter way (2) normally should be preferred.

In the drawings

Figure 2:
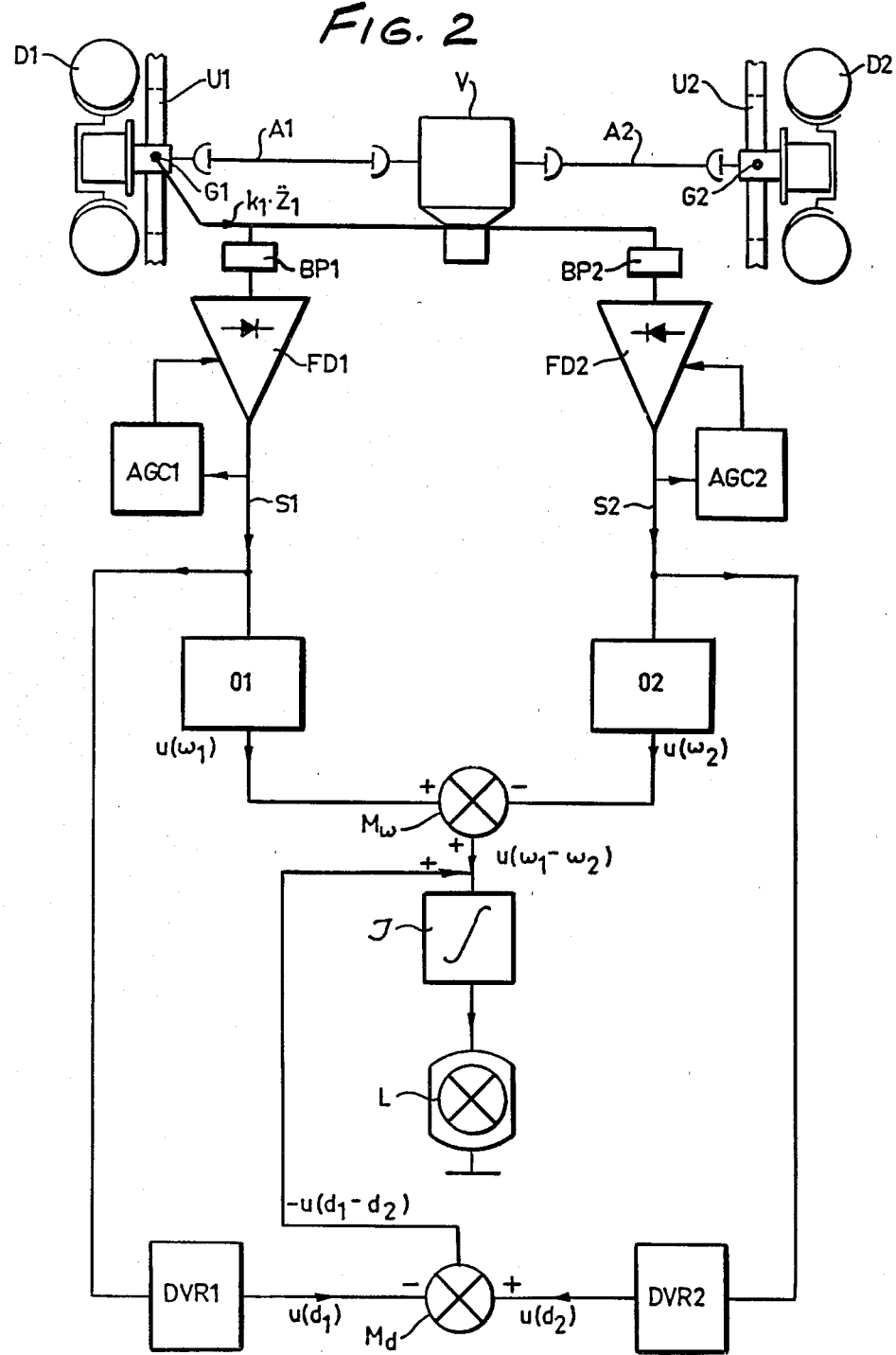

FIG. 1 is a schematic diagram of a first embodiment illustrating the principles of the present invention and FIG. 2 is a schematic diagram of a second embodiment.

As shown in FIG. 1 the two partial axles A1 and A2 extend from the differential V to the respective wheel suspensions U1 and U2 with tires D1 and, respectively, D2. On each suspension an acceleration transducer, so-called accelerometers G1 and G2, are attached as closely as possible to the vertical plane of the tire, so that the vertical acceleration of the tire can be measured without being appreciably influenced from the elasticity and oscillations of the wheel suspension. Each accelerometer G1, G2 can consist of a piezoelectric quartz element, which is mounted facing upward (or donward) on the wheel suspension or on the fixed bearing hub and at its upper (and, respectively, lower) free end carries a metal plate. When the base point of the piezo element is accelerated when passing over roughs in the roadway, its movement is transferred vertically via the piezo element to said plate, the inertia of which opposes to the acceleration movement and thereby momentarily compresses (and, respectively, elongates) the element. The piezoelectric effect thereof then results in an A.C. impulse, which is proportional to its compression (elongation) caused by the road bumps and can be measured, and the amplitude of which decays due to the attenuation of the tire.

The said currents from each accelerometer G1, G2 which, thus, are substantially proportional to the respective vertical accelerations of the tires D1 and D2 and here are designated by $k_1 \cdot \ddot{z}_1$ and, respectively, $k_1 \cdot \ddot{z}_2$, are at the present example first passed through a band-pass filter BP1 and, respectively, BP2 for the selection of a frequency range of the attenuation/natural oscillation frequency characteristic of the tire where the characteristic is changed substantially by variations in the parameter air pressure. Thereafter the two currents are amplified and detected each in a unit FD1 and, respectively, FD2 with automatic gain control circuit AGC1 and, respectively, AGC2 for the reduction of disturbances. (The disturbances can be reduced still more by housing the piezo element and the amplifier in a common copper casing). The resulting positive half-waves are smoothed, so that signals S1 and S2 are obtained which contain respective attenuation and natural frequency components for the two tires D1, D2.

The signals S1 and S2 are fed on one side directly each to a frequency voltage transformer 01 and 02 with hold circuit. The output signal from each transformer then is a signal corresponding to the natural oscillation frequency of the tire, viz. $u(\omega_1)$ and, respectively, $u(\omega_2)$, where the voltage u is a linear function of the angular frequency $\omega$.

On the other side the signals S1 and S2 are fed each to a derivator DVR1 and, respectively, DVR2, the outputs signals $u(d_1)$ and, respectively, $u(d_2)$ of which yield the voltage u as a function of the acceleration $\ddot{z}$ of the respective tire, i.e. are a measure of the attenuation.

The respective output signals are collected in pairs in analogous memories $M_\omega$ and, respectively, $M_d$, and the respective difference signals $u(\omega_1-\omega_2)$ and $u(d_1-d_2)$ for the two tires D1 and D2 are fed to an integrator I. When the output signal therefrom, i.e. the time integral $\int [u(\omega_1-\omega_2)-u(d_1-d_2)]$ dt during a certain minimum period falls below the value permitted for the driving safety, the indication lamp L lights up which is located at the driver, preferably on the instrument panel, and warns for the riskful unbalance between the tire pressures.

Apparently no indication of too low pressure in both tires is obtained when these pressures are equally low. These cases, however, are uncommon and also much less dangerous than different pressures. When, however, it is desired to prevent such cases, the way (1) with individual indication of the air pressure in each tire can be chosen. As shown in FIG. 2 output signal from a transducer then is compared with a reference signal instead of with the output signal from another transducer. For this reason, with a view on tire D1, also the filter BP2 is connected to the transducer G1 instead of to the transducer G2 for the tire D2 (which must be equipped in the same way as the tire D1) as indicated by dashing. The output signal $k_1 \cdot \ddot{z}_1$ of the transducer G1 now also passes through the second signal processing loop, but the band-pass filter BP2 now is dimensioned for another frequency range of the attenuation/frequency characteristic of the tire, which range with respect to air pressure variations is as flat as possible. The signal S2 hereby becomes a substantially constant reference signal, and indication is obtained in the same way as at (2), but now individually for each wheel.

The afore-described system also indicates for tires with non-uniform wear, for different types of tires and for unbalanced tires. Indication further is obtained for rolling risk and also for aqua planing, in that the transducer signal then is suppressed.

The invention is not restricted to the example described above, but different modifications within the scope of the invention can be imagined. Especially transducers (accelerometers) other than such of piezoelectric type can be imagined. Instead of carrying out analogous measuring as described above, digital measuring can be applied. When a coarser indication is deemed sufficient, it may be based only on one of the two characteristic magnitudes for the tire, viz. its attenuation or its natural oscillation frequency.

What we claim is:

1. A device for indicating pressure change in vehicle wheel tires, comprising transducers, which are fixed at wheel suspension means, adjacent the hub of an associated wheel, and continuously affected by the dynamic behavior of the wheel during drive of the vehicle, and electronic means for releasing a warning signal when the dynamic properties of the wheel depending on its tire pressure pass a predetermined limit, characterized in that the transducers are accelerometers for measuring the vertical acceleration of the wheel, each accelerometer having an output connected to a different electronic unit for separately feeding to it a primary signal decreasing with dropping tire pressure, when the wheel passes an irregularity on the road, each electronic unit including means for transforming the primary signal to a secondary signal expressing the vertical acceleration value for the wheel in a certain frequency region of the tire oscillation in dependence on the tire pressure, comparing means being provided for receiving the secondary signal from each respective electronic unit, referring to two corresponding wheels, and comparing them with each other and feeding a difference signal to means arranged to release a warning signal when the difference signal amounts to a predetermined value.

2. A device as defined in claim 1, wherein each accelerometer includes a piezo element which at one end is attached to said wheel suspension means and projects vertically therefrom to terminate in a free end carrying a weight, which element at acceleration of its attachment point in vertical direction is deformed and thereby emits said primary signal.

3. A device as defined in claim 1, wherein said means of each electronic unit comprises an amplifier and rectifier circuit for amplifying and rectifying said primary signal coming from each accelerometer, means for transforming a first part of said secondary signal from said circuit to a first voltage corresponding to the natural frequency of said tire oscillation, a derivator for derivating a second part of said secondary signal from said circuit for forming a second voltage corresponding to the attenuation effect of the tire as determined by the tire pressure, a first section of said comparing means for receiving and mutually comparing said first voltages from the two associated wheels to provide a first voltage difference, and a second section of said comparing means for receiving and comparing said second voltages from said two wheels to provide a second voltage difference, and an integrator for receiving the first and second voltage differences from respective sections of said comparing means and releasing the warning signal at unpermissible deviations in natural oscillation frequency and/or attenuation.

4. A device as defined in claim 1, including a band-pass filter for passing said frequency region of the tire oscillation and for restricting said primary signal from the accelerometer to a frequency range of the attenuation/oscillation frequency characteristic of the tire, which strongly depends on the tire pressure.

5. A device for indicating pressure change in vehicle wheel tires, comprising transducers, which are fixed at wheel suspension means, adjacent the hub of an associated wheel, and continuously affected by the dynamic behavior of the wheel during drive of the vehicle, and electronic means for releasing a warning signal when the dynamic properties of the wheel depending on its tire pressure pass a predetermined limit, characterized in that the transducers are accelerometers for measuring the vertical acceleration of the wheel, each accelerometer having an output connected to a different electronic unit for separately feeding to it a primary signal decreasing with dropping tire pressure, when the wheel passes an irregularity on the road, each electronic unit including means for transforming the primary signal to a secondary signal expressing the vertical acceleration value for the wheel in a certain frequency region of the tire oscillation, comparing means being provided for receiving the secondary signal referring to one wheel and for receiving a nominal reference signal, comparing the secondary signal with the nominal signal and feeding a difference signal to means arranged to release a warning signal when the difference signal amounts to a predetermined value.

6. A device as defined in claim 5, including a first band-pass filter for passing said frequency region of the tire oscillation for restricting said primary signal from the accelerometer to a frequency range of the attenuation/oscillation frequency characteristic of the tire, which strongly depends on the tire pressure, and a second band-pass filter, connected in parallel with said first filter, for restricting a portion of said primary signal from the accelerometer to an only slightly pressure-depending frequency range of the attenuation/oscillation frequency characteristic of the tire, to form said nominal reference signal via an additional electronic unit connected to said comparing means.

* * * * *